US010739071B2

(12) United States Patent
Jorgenson et al.

(10) Patent No.: US 10,739,071 B2
(45) Date of Patent: Aug. 11, 2020

(54) INTELLIGENT CONTROL SYSTEM FOR ROTARY VACUUM DRUM DRYING SYSTEM

(71) Applicant: Anderson Industries, LLC, Webster, SD (US)

(72) Inventors: Joel Jorgenson, Fargo, ND (US); Daniel Ewert, Lake Park, MN (US)

(73) Assignee: Anderson Industries, LLC, Webster, SD (US)

( * ) Notice: Subject to any disclaimer, the term of this patent is extended or adjusted under 35 U.S.C. 154(b) by 201 days.

(21) Appl. No.: 15/905,544

(22) Filed: Feb. 26, 2018

(65) Prior Publication Data

US 2019/0128608 A1 May 2, 2019

Related U.S. Application Data

(60) Provisional application No. 62/580,878, filed on Nov. 2, 2017.

(51) Int. Cl.
| | |
|---|---|
| *F26B 21/12* | (2006.01) |
| *A23L 3/48* | (2006.01) |
| *F26B 17/32* | (2006.01) |
| *F26B 17/00* | (2006.01) |
| *F26B 5/12* | (2006.01) |
| *F26B 17/28* | (2006.01) |
| *F26B 21/10* | (2006.01) |
| *F26B 25/22* | (2006.01) |

(52) U.S. Cl.
CPC .............. *F26B 21/12* (2013.01); *A23L 3/48* (2013.01); *F26B 5/12* (2013.01); *F26B 17/008* (2013.01); *F26B 17/282* (2013.01); *F26B 17/32* (2013.01); *F26B 21/10* (2013.01); *F26B 25/22* (2013.01); *A23V 2002/00* (2013.01)

(58) Field of Classification Search
CPC ........ F26B 21/12; F26B 17/32; F26B 17/008; F26B 21/10; F26B 5/12; F26B 25/22; F26B 17/282; F26B 11/049; F26B 17/288; F26B 17/28; F26B 3/28; F26B 5/04; F26B 5/042; F26B 17/286; A23L 3/48; A23V 2002/00; D06B 15/04; B29D 7/01; B01D 9/0063; B01D 9/0022; B01D 9/0059; B01D 37/04; B01D 37/00
USPC ............ 34/406, 92, 453, 403, 558, 559, 560
See application file for complete search history.

(56) References Cited

U.S. PATENT DOCUMENTS 3,972,779 A * 8/1976 Harrison .............. B01D 9/0063
                                                                196/14.5

* cited by examiner

*Primary Examiner* — Edelmira Bosques
*Assistant Examiner* — Bao D Nguyen
(74) *Attorney, Agent, or Firm* — Womble Bond Dickinson (US) LLP; Daniel E. Ovanezian

(57) ABSTRACT

A rotary vacuum drum drying system is described. The system may include a plurality of sensors and a control system operatively coupled with the plurality of sensors. The control system includes a processing device to monitor a plurality of parameters of the vacuum drying system received from the plurality of sensors and automatically adjust one or more of the plurality of parameters based on the monitor of the plurality of parameters.

4 Claims, 5 Drawing Sheets

INTELLIGENT CONTROL SYSTEM FOR ROTARY VACUUM DRUM DRYING SYSTEM

CROSS REFERENCE TO RELATED APPLICATIONS

This application claims the benefit of U.S. Provisional Patent Application No. 62/580,878, filed on Nov. 2, 2017, which is hereby incorporated by reference in its entirety.

TECHNICAL FIELD

Aspects and implementations of the present disclosure relate to vacuum drying systems.

BACKGROUND

Rotary vacuum drum dryers were originally developed as a means to separate solids from a slurry. Vacuum drum dryers are one of the first industrial systems created to separate solids from liquids, and are prevalent in diverse industries from food production, wine and distilled spirits production, and the production of various materials for the construction sector. In basic vacuum drum dryers, the level of the slurry tank with respect to the rotating drum and the rotational speed of the drum are the two parameters most commonly used to make performance adjustments.

BRIEF DESCRIPTION OF THE DRAWINGS

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

DETAILED DESCRIPTION

Aspects and implementations of the present disclosure are directed to an apparatus for and method of controlling a rotary vacuum drum drying system. In one embodiment, the rotary vacuum drum drying system includes a plurality of sensors and a control system operatively coupled with the plurality of sensors. The control system includes a processing device configured to monitor the plurality of parameters of the vacuum drying system received from the plurality of sensors and automatically, without manual intervention from an operator of the system, adjust one or more of the plurality of parameters based on the monitor of the plurality of parameters.

In conventional vacuum drying systems, the lack of instrumentation prevents a refined means to control, monitor, or predict the performance of a rotary vacuum drum dryer. Embodiments of the present disclosure describe an intelligent control system that monitors multiple parameters to optimize drying performance and to analytically determine machine health and heuristics. The control system may include remote monitors, sensors, and switches coupled to a display system. The display system is driven by a computer system containing memory components, input/output ports for accepting user commands, and remote communication to wired and wireless channels as described in further detail below. The ability to gather data on the operation of the vacuum drum drying apparatus allows for optimal design for performance, throughput, and system longevity.

Figure 1:
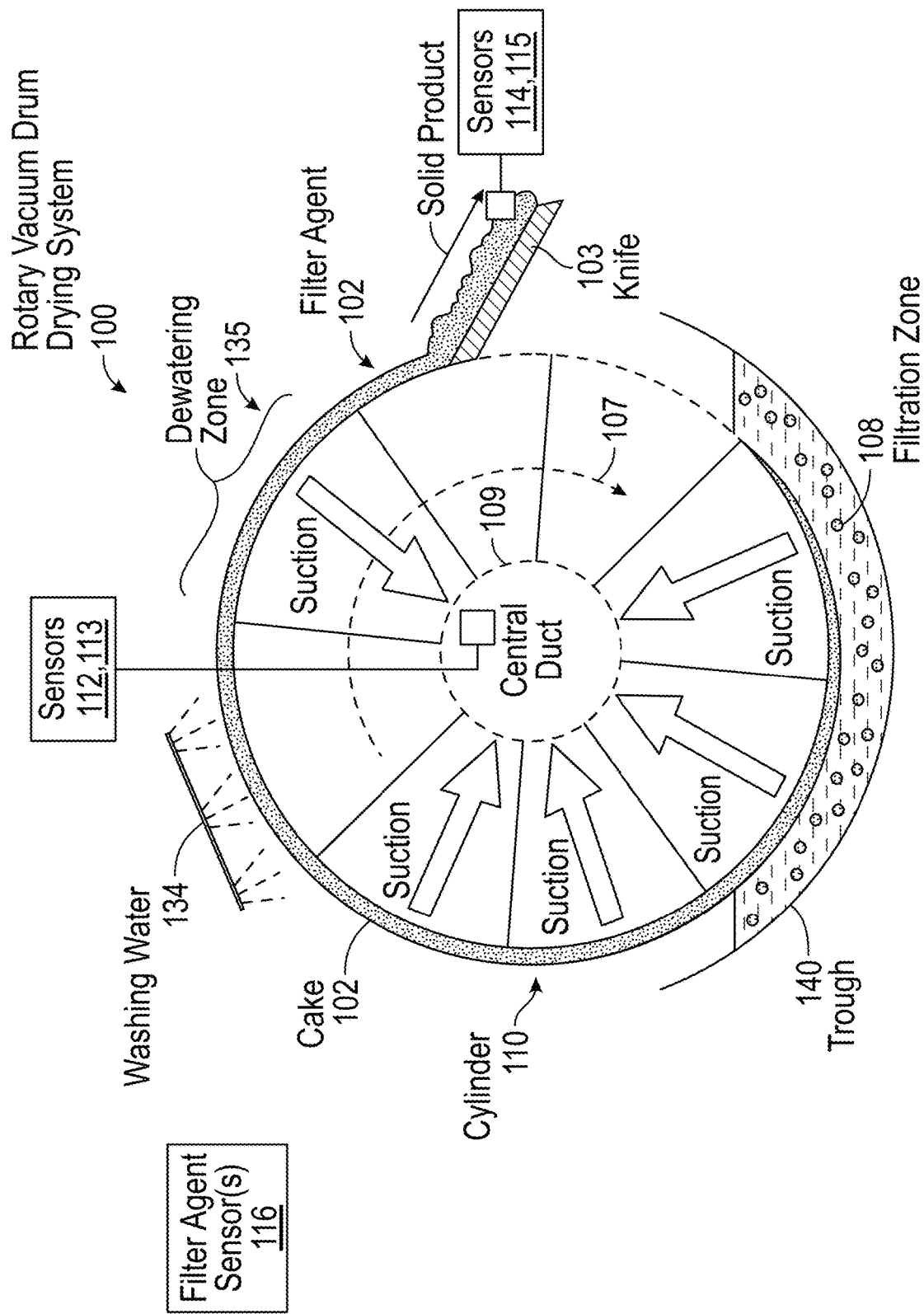
FIG. 1 is a cross section of a rotary vacuum drum drying system in accordance with one embodiment of the present disclosure.

FIG. 1 is a cross section of a rotary vacuum drum drying system in accordance with one embodiment of the present disclosure. In this embodiment, rotary vacuum drum drying system 100 includes a central component composed of a perforated cylinder 110 covered with a breathable membrane cover, with a removable filter agent coating. The cylinder 110 rotates 107 along its transverse axis, with a trough 140 containing a slurry mixture that immerses the lower region of the cylinder.

The portion of the cylinder 110 immersed in the slurry mixture may be defined as a filtration zone 108. By comparison, the portion of the cylinder not immersed in the slurry mixture may be defined as the drying zone. If a water rinse 134 is added to the process of vacuum drum drying, the section of drum immediately past the water rinse may be defined as a dewatering zone 135.

As the cylinder 110 rotates 107, a vacuum is applied near the point of rotation in central duct 109, suctioning the slurried material (also referred to as "cake") 102 on the surface of the cylinder towards the interior of the drum. Air passes through perforations in the surface of the cylinder 110, solids from the slurried material 102 gathers on the filter agent. As the cylinder drum 110 rotates, the continued vacuum pressure pulls moisture from the drying agent. In certain embodiments, a water rinse 134 is applied to the exterior of the vacuum drum, where the re-wetting of the slurry provides operational benefit for the drying. In one embodiment, at a point of approximately 270 degrees of rotation, a knife or blade 103 scrapes the outside layer of filter agent 102 from the rotating drum cylinder 110 to generate solid product 103. Alternatively, other the scraping of filter agent may be performed at other degrees of rotation of the cylinder. The solid product 103 is then from the system.

Figure 2:
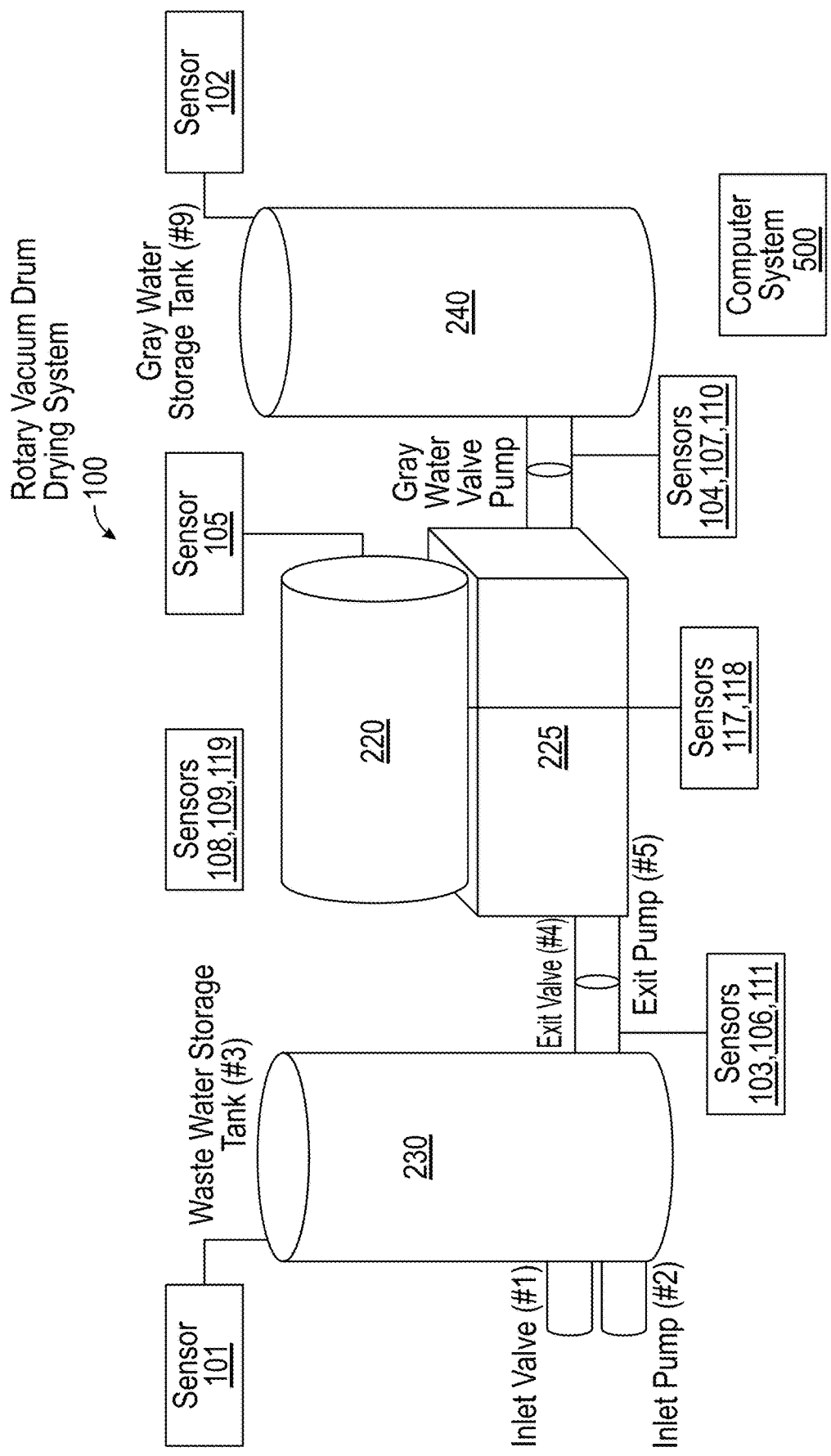
FIG. 2 illustrates a configuration of the vacuum drum dryer surrounded by other system components the system such as tanks and pumps that may be connected to the control system in accordance with one embodiment of the present disclosure.

In an instrumented system for separating solids from a slurry mixture, the slurry mixture is initially stored in a waste water tank 230 of FIG. 2. The slurry mixture from the slurry tank 230 is pumped into the trough of the vacuum drum dryer for separation into solid and liquid components. The recovered liquids extracted by the drum drying process are stored in a gray water tank 240 of FIG. 2, with the quality of the recovered liquid measured by sensors in the connection between the vacuum drum dryer and the gray water tank.

Embodiments of the present disclosure describe an electronic control and monitoring system for the rotary vacuum drum drying system. Using advanced sensing, data analytics, processing and communications, the control system allows any time access from any location globally. The control system may be reprogrammed via the communications channel, providing the capability for a remote technical staff to monitor sensors, insert test code, make measurements, and update the programming on any machine worldwide.

The electronic control and monitoring system may be composed of a number of sensors and other components described below to monitor parameters of the rotary vacuum drum drying system. In one embodiment, the rotary vacuum drum drying system 100 includes one or more filter agent sensors 116 to monitor the quantity of unused filter agent (on the drum and/or on reserve). The system may also include a rotational speed sensor 112 for measuring the speed of rotation of the vacuum drum cylinder 110 and vacuum pressure sensor 113 for measuring the vacuum pressure of the system discussed above. In some embodiments, the system may also include a moisture sensor 114 to monitor the moisture content of the removed filter agent 102 and a mass sensor 115 to monitor the mass or rate of mass of the removed filter agent 102. It should be noted that the various sensors are conceptually illustrated in the figures and are not necessarily physically disposed in the locations at which they are shown. For example, sensors 112 and 113 are not necessarily physically disposed within the central duct 109 but, rather, may reside outside the central duct and may also reside beyond the surface of cylinder 110. It should be noted that in one embodiment, the control system may combine both measured parameters (e.g., rotational speed) and derived parameters (e.g., mass of removed material per watt of electrical energy used by the vacuum pump).

FIG. 2 illustrates a configuration with the vacuum drum dryer 220 surrounded by other system components such as tanks and pumps that may be connected to the intelligent control system. In this embodiment, the rotary vacuum drum drying system includes vacuum drum dryer 220, wastewater storage tank 230, and gray water storage tank 240.

Integrating system information with a control system allows for greater throughput, efficiencies, and cost savings. For example, information regarding the level of the wastewater storage tank 230 is important to know to ensure that vacuum drum dryer 220 continues to receive waste water and prevent unnecessary shearing of filter agent. Also, ensuring that the outflow to the clean water outlet, pump, and tank is working prevents backflow into the vacuum drum dryer 220 that could damage systems and cause potentially costly and dangerous system failures.

In some embodiments, the intelligent control system may also include other sensors to monitor other parameters of rotary vacuum drum drying system 100. For example, the system may also include sensors 101 and 102 to monitor levels of inlet and outlet fluids in tanks 230 and 240, respectively. The system may also include sensors 103, 104 to monitor flow rates of inlet and outlet fluids to vacuum drum dryer 220, electrical sensors 106, 107 on the power consumed by inlet and outlet pumps, sensor 111 to monitor the solid content of the inlet fluid to vacuum drum dryer 220, and sensor 110 to monitor the clarity of outlet fluid to tank 240. The system may also include a sensor 105 to monitor the electrical power consumption of motors (not illustrated) inside housing base 225 driving vacuum drum dryer 220. The system may also include a sensor 109 for monitoring the ambient humidity levels of the environment in which the vacuum drum dryer 220 is operating. The system may also include sensors 117 and 119 for monitoring the Machine vibration and temperatures (used for diagnostics and machine health analysis) of the vacuum drum dryer 220. The system may also include an external sensor 119 to monitor the time of day and calendar day.

The monitored parameters noted above may be used to optimize the efficiency of the wastewater treatment process. For example, the rotary vacuum drum drying system may be optimized for at least one of throughput of water, drying agent removal, or water removal. Optimizing for the throughput of water might include high rates of vacuum and high rotational rates for the vacuum drum. Optimizing for drying agent removal might be composed of low rates of vacuum and low rates of rotation. Optimizing for water removal might consist of high rates of vacuum and low rates of rotation. These optimization operations may or may not be the same as the settings used to optimize the individual operation of the vacuum drum dryer. The control system composed of a processing device 502 receives information from the sensors about system 100 status and performance. In one embodiment, the information may be displayed to a user on a graphical user interface 300, for example, as illustrated in FIG. 3.

Figure 3:
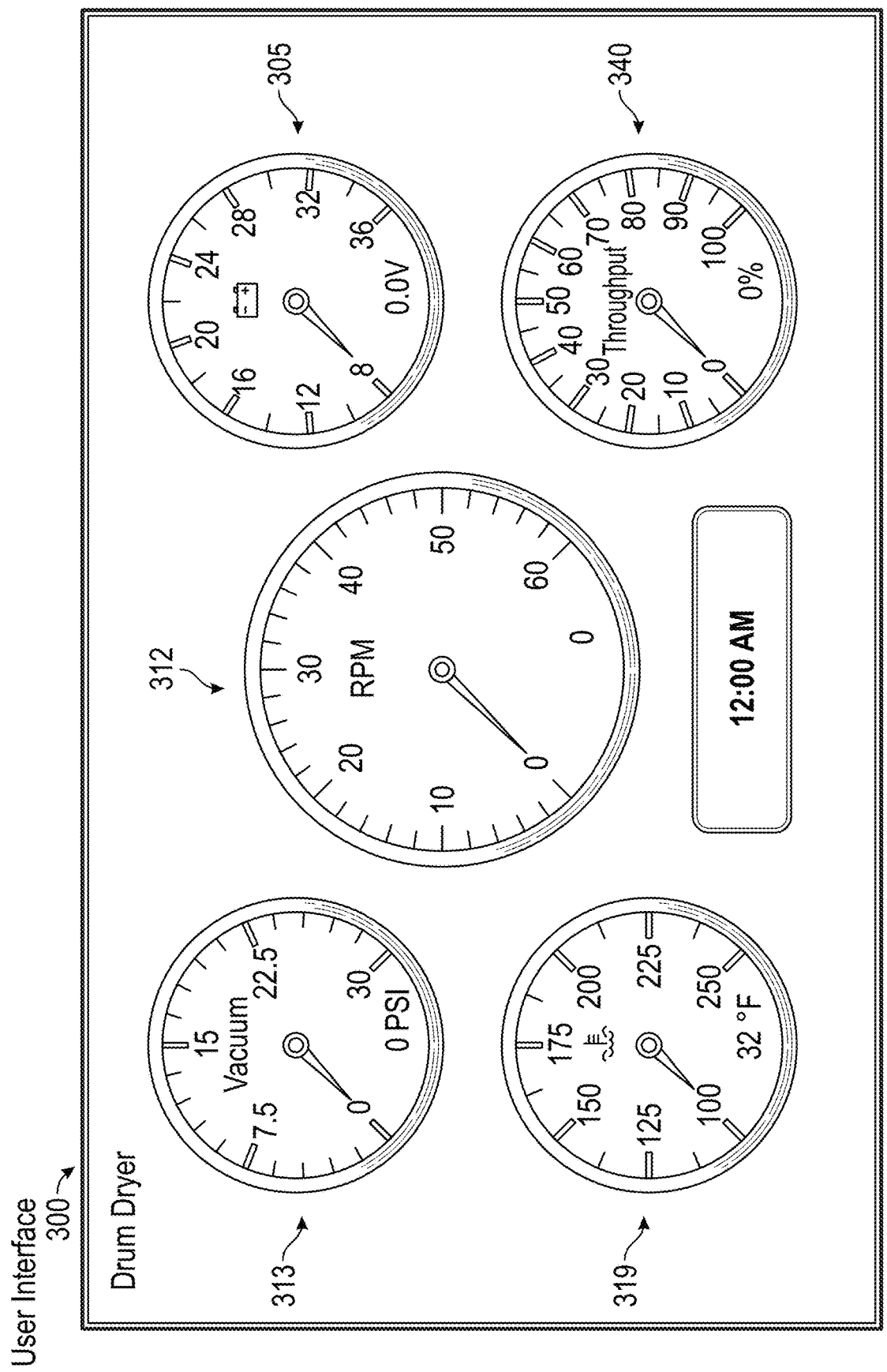
FIG. 3 illustrates an example a user interface in accordance with one embodiment of the present disclosure.

FIG. 3 illustrates one embodiment of a user interface. In this embodiment, user interface 300 includes the following gauges: gauge 313 showing the monitored vacuum pressure from sensor 113; gauge 312 showing rotational speed of the vacuum drum cylinder from sensor 112; gauge 319 showing temperature from sensor 119; gauge 305 showing the voltage of the motor monitored by sensor 105; and gauge 340 showing throughput of water from any of the inlet or outlet sensor discussed above. Alternatively, user interface 300 may include other gauges and indicators from various other sensors.

The sensors and user interface components may be located on the vacuum drum dryer, and may also be connected to other system components surrounding the vacuum drum dryer (such as inlet and outlet tanks, motors, and ambient environmental sensors).

Figure 4:
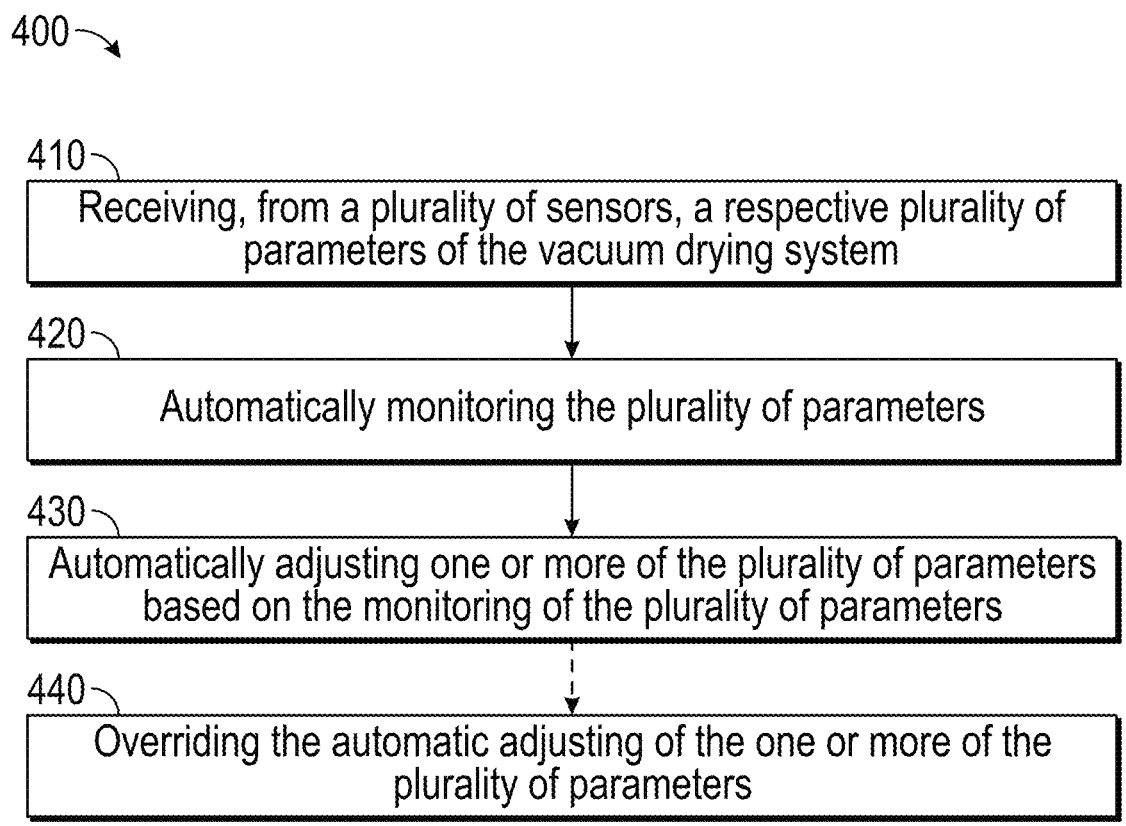
FIG. 4 depicts a flow diagram of a method 400 for controlling a vacuum drying system in accordance with one implementation of the present disclosure.

With reference to FIG. 4, flowchart 400 illustrates example functions used by various embodiments. Although specific function blocks ("blocks") are disclosed in flowchart 400, such blocks are examples. That is, embodiments are well suited to performing various other blocks or variations of the blocks recited in flowchart 400. It is appreciated that the blocks in flowchart 400 may be performed in an order different than presented, and that not all of the blocks in flowchart 400 may be performed.

FIG. 4 depicts a flow diagram of a method 400 for controlling a vacuum drying system in accordance with one implementation of the present disclosure. Various portions of flowchart 400 may be performed by different components (e.g., the sensors and processing device).

At block 410, data sent by one or more sensors of rotary vacuum drum drying system described above on one or more parameters of the system is received by a control system (e.g., processing device 502). At block 420, the control system automatically monitors the one or more received parameters. At block 430, the control system automatically adjusts the one or more of the plurality of parameters based on the monitoring of the parameters. The automatic monitoring and adjustment is performed by the control system without manual intervention from an operator of the system. In one embodiment, the control system can override the automatic adjusting of the parameters at block 440.

Embodiments of the vacuum drum dryer described herein accomplish different results than conventional vacuum drum dryer with no intelligent controls. The efficiencies of the vacuum drum dryer with the electronics, as measured by output product (removed solid mass and extracted liquid)

will be greater than a conventional system, as the drying parameters may be adjusted in real-time based on changing system conditions. For example, operating a drum dryer on a warm, arid day requires less vacuum pressure and less drying time, allowing the rotational speed of the vacuum drum dryer to be increased and the pressure created by the vacuum pump to be reduced. Additionally, the quality of the product produced (again measured in the removed solid mass and the extracted liquid) when using the intelligent control system, as the parametric values of the outputs may be measured for consistency. As these examples show, the quality and the efficiency of the vacuum drum dryer when using an intelligent control system are increased to levels unattainable through conventional operation.

The end user may adjust all settings via the wired and wireless communications channels (e.g., cellular, satellite, and/or local connectivity such as Bluetooth™, Zigbee™, or WiFi™) using components of computer system 500. The choice of communication channels ensure the potential to connect from any platform at any time, and may be selected based on power consumption, channel capacity, noise, and security.

Figure 5:
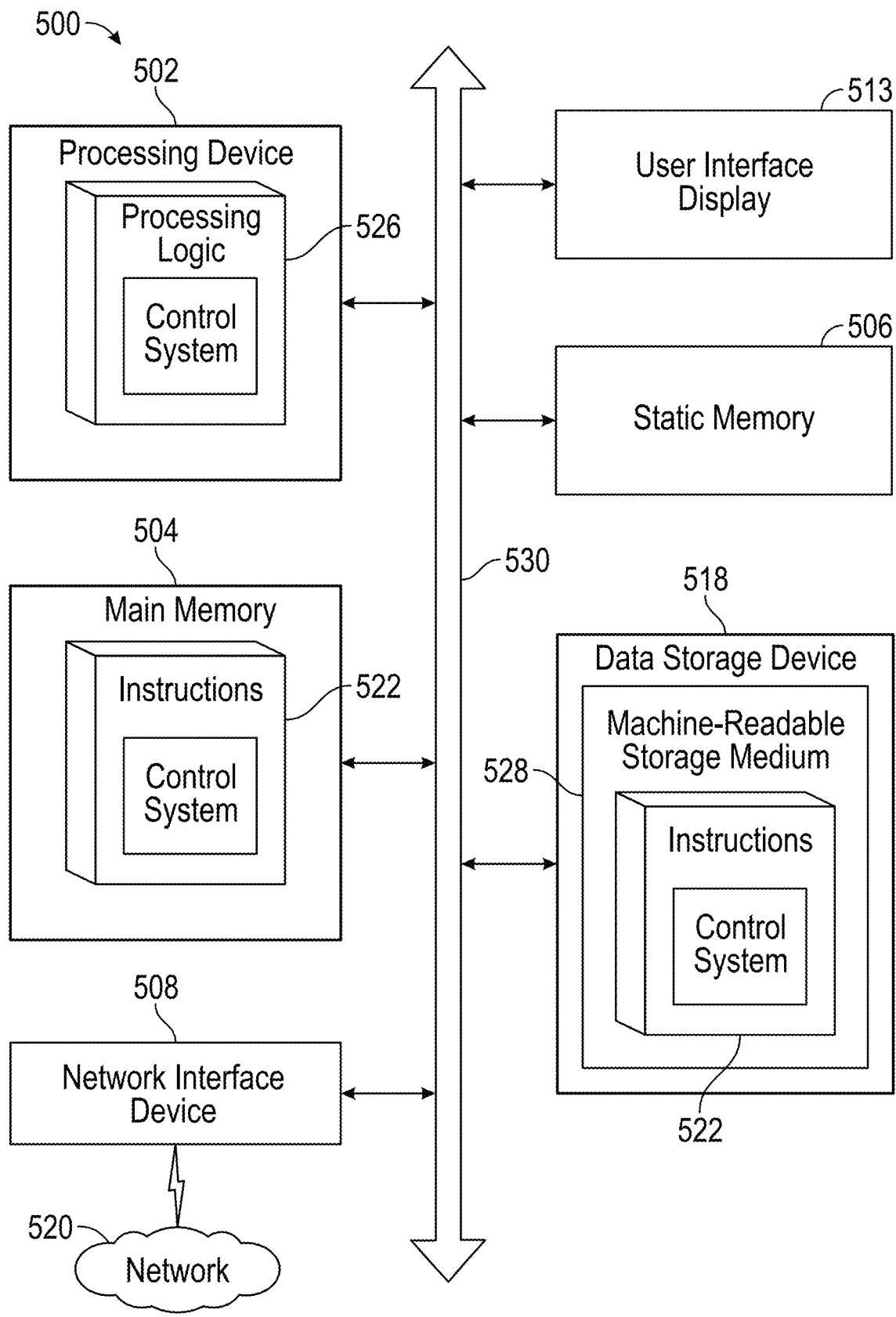
FIG. 5 is a block diagram illustrating an example computer system, in accordance with one embodiment of the present disclosure.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a web appliance, a server, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server configured to control the operations of rotary vacuum drum drying system 100.

The exemplary computer system 500 includes a processing device 502, a user interface display 513, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526, which may be one example of system 100 shown in FIGS. 1 and 2, for performing the operations and blocks discussed herein.

User interface display 513 may be used to display the user interface illustrated in FIG. 3 as well as other information and also include input display information.

The data storage device 518 may include a machine-readable storage medium 528, on which is stored one or more set of instructions 522 (e.g., software) embodying any one or more of the methodologies of functions described herein, including instructions to cause the processing device 502 to execute device identifier 200. The instructions 522 may also reside, completely or at least partially, within the main memory 504 or within the processing device 502 during execution thereof by the computer system 500; the main memory 504 and the processing device 502 also constituting machine-readable storage media. The instructions 522 may further be transmitted or received over a network 520 via the network interface device 508.

The machine-readable storage medium 528 may also be used to store instructions to perform a method for device identification, as described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A rotary vacuum drum drying system comprising:
a plurality of sensors;
a control system operatively coupled with the plurality of sensors, the control system comprising a processing device to:
monitor a plurality of parameters of the rotary vacuum drum drying system received from the plurality of sensors; and
automatically adjust one or more of the plurality of parameters based on the monitor of the plurality of parameters; and
a rotatable vacuum drum having a central duct, wherein the plurality of sensors comprises a vacuum pressure sensor operative coupled in the central duct to monitor vacuum pressure within the vacuum drum, and wherein the processing device is to adjust vacuum pressure based on the monitor of the vacuum pressure.

2. A rotary vacuum drum drying system comprising:
a plurality of sensors;
a control system operatively coupled with the plurality of sensors, the control system comprising a processing device to:
monitor a plurality of parameters of the rotary vacuum drum drying system received from the plurality of sensors; and
automatically adjust one or more of the plurality of parameters based on the monitor of the plurality of parameters; and
a rotatable drum having a central duct, wherein the plurality of sensors comprises a sensor operative coupled in the central duct to monitor a speed of rotation of the vacuum drum, and wherein the processing device is to adjust the speed of rotation based on the monitor of the speed of rotation.

3. A rotary vacuum drum drying system comprising:
a plurality of sensors;
a control system operatively coupled with the plurality of sensors, the control system comprising a processing device to:
monitor a plurality of parameters of the rotary vacuum drum drying system received from the plurality of sensors; and
automatically adjust one or more of the plurality of parameters based on the monitor of the plurality of parameters;
a rotatable drum having an outer surface to transport solid product;
a blade operatively coupled with the outer surface of the rotatable drum to transport the solid product away from the rotatable drum, wherein the plurality of sensors comprises a sensor to monitor mass of removed filter agent, and wherein the processing device is to adjust a blade position based on the monitor of the mass of removed filter agent.

4. A rotary vacuum drum drying system comprising:
a plurality of sensors;
a control system operatively coupled with the plurality of sensors, the control system comprising a processing device to:
monitor a plurality of parameters of the rotary vacuum drum drying system received from the plurality of sensors; and
automatically adjust one or more of the plurality of parameters based on the monitor of the plurality of parameters;
a rotatable drum; and
a liquid storage tank coupled with the rotatable drum, wherein the plurality of sensors comprises a flow sensor to monitor an outflow rate of liquid from the liquid storage tank, and wherein the processing device is to adjust the outflow rate of liquid based on the monitor of the outflow rate of liquid.

* * * * *